US006875395B2

(12) United States Patent
Kisha et al.

(10) Patent No.: US 6,875,395 B2
(45) Date of Patent: Apr. 5, 2005

(54) METHOD OF MAKING AN APPLIQUE

(75) Inventors: Brent J. Kisha, Macomb, MI (US); Brett A. Stahl, Grosse Pointe Farms, MI (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 10/289,893

(22) Filed: Nov. 7, 2002

(65) Prior Publication Data

US 2003/0054137 A1 Mar. 20, 2003

Related U.S. Application Data

(63) Continuation of application No. 09/633,373, filed on Aug. 7, 2000, now abandoned.

(51) Int. Cl.[7] .................................................. B32B 3/00
(52) U.S. Cl. ........................ 264/482; 428/189; 428/190; 428/192; 428/80; 428/81
(58) Field of Search .......................... 264/482; 428/190, 428/192, 189, 80, 81

(56) References Cited

U.S. PATENT DOCUMENTS 4,588,629 A 5/1986 Taylor
4,961,896 A 10/1990 Constantino
5,009,943 A 4/1991 Stahl
5,149,388 A 9/1992 Stahl
5,422,173 A * 6/1995 Stahl .......................... 428/189
5,573,834 A * 11/1996 Stahl ....................... 428/195.1
5,817,393 A 10/1998 Stahl
5,914,176 A 6/1999 Myers
5,990,444 A * 11/1999 Costin ................... 219/121.69

FOREIGN PATENT DOCUMENTS

DE 298 21 891 U1 12/1998
GB 2337724 A * 12/1999 ........... B32B/31/18

* cited by examiner

*Primary Examiner*—Elizabeth M. Cole
(74) *Attorney, Agent, or Firm*—Brooks Kushman P.C.

(57) ABSTRACT

The present invention involves an applique for applying a fabric pattern to an object. The applique comprises a laminate having an outer periphery to define a first predetermined shape corresponding to the fabric pattern and has etches formed adjacent the periphery to simulate an appearance of stitching. In one embodiment, the laminate comprises a top fabric layer and a bottom fabric layer with a periphery, wherein the bottom fabric layer periphery corresponds to the outer periphery. The top fabric layer is a strip attached to the bottom layer, wherein the top fabric layer is disposed adjacent the outer periphery. The laminate has etches formed on the top fabric layer so that the top fabric layer simulates the appearance of stitching. In another embodiment, the laminate comprises a top fabric layer and a bottom fabric layer, wherein the top fabric layer has a second predetermined shape. The top fabric layer is attached to the bottom fabric layer and disposed inward from the outer periphery. The bottom fabric layer has the first predetermined shape and etches formed thereon adjacent the outer periphery.

6 Claims, 4 Drawing Sheets

METHOD OF MAKING AN APPLIQUE

This application is a continuation of Ser. No. 09/633,373 filed Aug. 7, 2000, now abandoned.

TECHNICAL FIELD

The present invention relates to a system and a method of making an applique for applying a fabric pattern to an object.

BACKGROUND ART

There is a need to improve the process of manufacturing appliques or patterns that appear to be sewn but are in fact only heat sealed and/or adhered onto garments. In many situations, because stitches provide a three dimensional look above the surface of a fabric, an applique that is sewn onto a garment typically is regarded as more aesthetically pleasing than an applique which is merely heat sealed onto a garment. Generally, the process of sewing an applique onto a garment involves a relatively high cost for a number of reasons. One in particular is that the garment on which the applique is to be sewn must generally be located at the site of manufacture of the applique, due to the apparatus involved in sewing. Another reason is that the time involved in sewing is significantly greater than merely adhering the applique to the garment. Yet other reasons are the required costs to maintain apparatus for sewing and labor costs for operations thereof.

As provided in U.S. Pat. Nos. 5,009,943; 5,149,388; and 5,422,173 (all to Stahl), heretofore lettering, numerals and designs have been embroidered about the periphery and then positioned on and heat sealed to a garment or other fabrics, and thus, while not actually stitched to the garment or other fabric, appear to have been stitched thereto. Embroidering the periphery of the letters etc. and then heat sealing the letters to the garment was an improvement over actually embroidering the letters to the garment, but still was more costly than desired. Thus, a need existed to reduce further cost of this apparent embroidery of appliques or the like to garments and other fabrics.

Thus, what is needed is an improved method of manufacturing an applique having a stitched or sewn aesthetic look.

What is also needed is an improved method of manufacturing an applique which may be adhered onto a garment yet maintains a stitched or sewn aesthetic look.

What is further needed is an improved method of manufacturing an applique which is cost effective.

DISCLOSURE OF INVENTION

Accordingly, it is an object of the present invention to provide for an improved applique for applying a fabric pattern to an object. The applique comprises a laminate having an outer periphery defining a predetermined shape corresponding to the fabric pattern and having etches formed therein adjacent the periphery to simulate an appearance of stitching.

In one embodiment, the laminate comprises a top fabric layer and a bottom fabric layer. The periphery of the bottom fabric layer corresponds to the outer periphery of the applique. The top fabric layer is a strip heat sealed to the bottom layer adjacent the letter's outer periphery and has etches formed thereon so that the top fabric layer simulates the appearance of stitching.

In another embodiment, the laminate comprises a top fabric layer and a bottom fabric layer, wherein the top fabric layer has a second predetermined shape and is heat sealed to the bottom fabric layer. The top fabric layer is disposed inward from the outer periphery of the bottom fabric layer. The bottom fabric layer has a first predetermined shape and has etches formed thereon adjacent the outer periphery thereby simulating the appearance of stitching.

It is another object of the present invention to provide an improved method of making an applique. The method comprises providing a fabric layer for the applique and etching on the fabric layer to form an appearance of stitching thereon. The method further comprises cutting the fabric layer to define an outer periphery.

It is yet another object of the present invention to provide an improved method of making an applique with a heated device. The method comprises providing a single-ply fabric layer for the applique, etching the fabric layer with the heated device to form a predetermined stitch pattern thereon, and sealing the fabric layer with the heated device along a first predetermined outline.

It is still another object of the present invention to provide for an improved system for making an applique with a laser beam. The system comprises a first mechanism for supporting a fabric layer for the applique and a second mechanism for etching on the fabric layer to form an appearance of stitching thereon and for cutting the fabric layer adjacent the etching to define an outer periphery of the fabric layer.

BEST MODE FOR CARRYING OUT THE INVENTION

Figure 1:
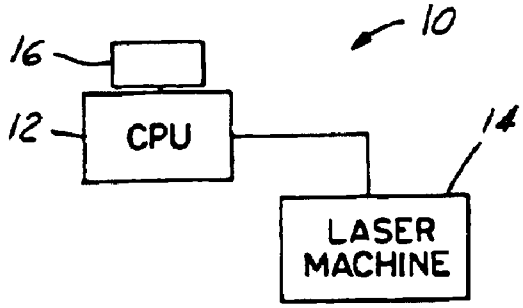
FIG. 1 is a schematic diagram illustrating the overall system which makes an applique in accordance with one embodiment of the present invention.

FIG. 1 schematically illustrates a system 10 for making an applique with a laser beam. System 10 includes a control or central processing unit (CPU) 12, laser apparatus or machine 14, and monitor 16. As shown in FIG. 1, control 12 is in communication with monitor 16, and controls operation of laser apparatus 14.

Control 12 may be any suitable type of central processing unit in communication with a compatible monitor 16, such as a Pentium computer connected to any suitable compatible monitor.

Laser apparatus 14 provides a mechanism for supporting and cutting the fabric layer to form an outer periphery of the applique. Laser apparatus 14 also provides a mechanism for etching on the outer periphery of the fabric layer to form an appearance of stitching thereon. Laser apparatus 14 may be any type of conventional laser cutting device having a cutting bed upon which fabric layers may be placed and having an X-Y plotter which includes a laser head disposed thereon. For example, laser apparatus 14 may be an Atlanta FB-1500 Laser Cutting System manufactured by CADCAM Technologies, Inc. of Knottingham, England.

Figure 2:
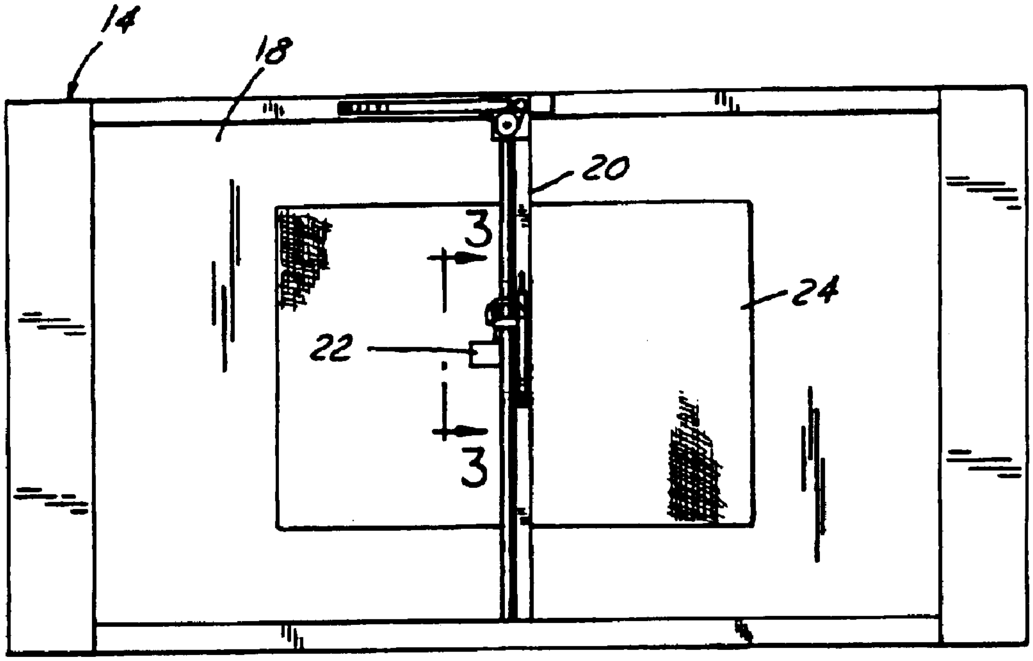
FIG. 2 is a top view of a laser apparatus in accordance with the system of FIG. 1.
Figure 3:
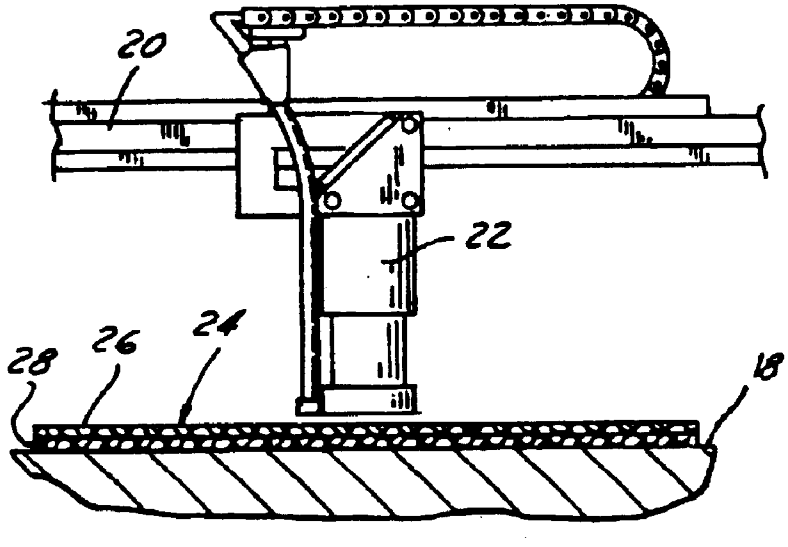
FIG. 3 is a side view of a laser head of the laser apparatus of FIG. 2.

As shown in FIG. 2, laser apparatus 14 includes a conventional machine bed 18 over which an X-Y plotter cutter 20 may be movably disposed. As shown in FIGS. 2 and 3, X-Y plotter cutter 20 includes conventional laser head 22 attached thereto for cutting and etching a fabric, such as fabric 24 having layers 26, 28. Fabric 24 is initially placed on machine bed 18 and under cutter 20 and laser head 22 which moves along machine bed 18 to etch and/or cut fabric 24. Fabric 24 also may be held onto bed 18 by any suitable means (not shown), e.g., a weight or adhesive tape may be placed on fabric 24 and bed 18 to avoid movement of fabric 24 during cutting or etching.

Figure 4:
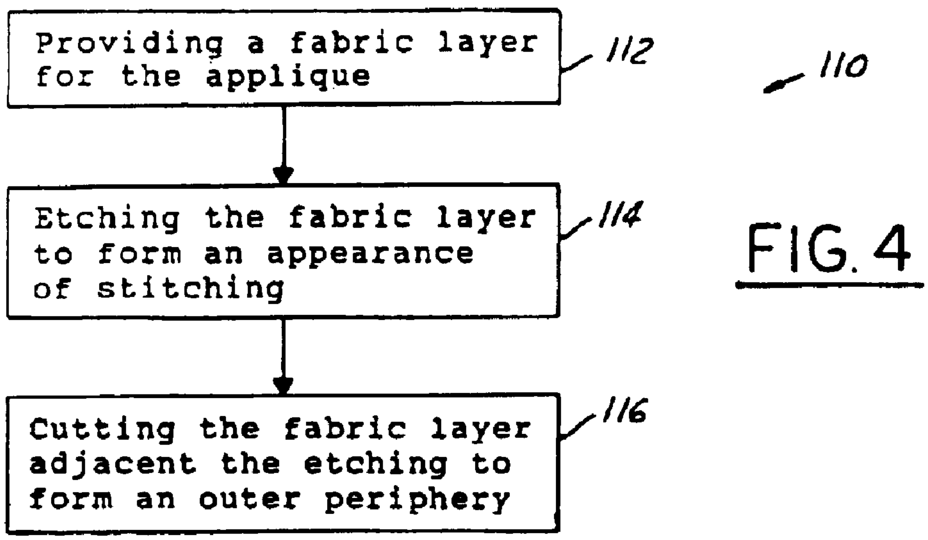
FIG. 4 is a flowchart illustrating one method of making an applique with the system of FIG. 1 in accordance with the present invention.

FIG. 4 schematically illustrates one method of implementing system 10 of FIG. 1. The method as shown in reference 110 includes providing a fabric layer for the applique in box 112, etching on the fabric layer to form an appearance of stitching thereon in box 114, and cutting the fabric layer adjacent the etching to form an outer periphery of the applique in box 116.

Control 12 may include one or a plurality of pre-installed software programs. In this embodiment, control 12 includes a plurality of pre-installed programs to setup and operate laser apparatus 14. The programs include a stitch pattern software package, an embroidery software package, and a laser cutting package. For example, the pre-installed stitch pattern software package may be a conventional stitch pattern software package which allows a user to upload a stitch pattern and accept the stitch pattern from an input device, e.g. scanner or fax, into control 12. Moreover, the embroidery software package may be any conventional embroidery software package that allows a user to download a saved file containing information of the uploaded stitch pattern via the stitch pattern software package. As will be described in greater detail below, the software packages allow a user to select a prestored file of a desired stitch pattern and designate lines on a stitch pattern image in order to define cuts and engravings made on fabric layers which are placed on machine bed 18.

In this embodiment, control 12 displays selection windows (not shown) of a graphical user interface on computer monitor 16 with which a user may interact by using a conventional keyboard and/or a conventional mouse. The keyboard and/or mouse may, in turn, be in communication with control or central processing unit 12 which is in communication with computer monitor 16. Additionally, it is to be noted that selection windows mentioned herein may be any conventional selection menu window suitable with control 12.

Figure 5A:
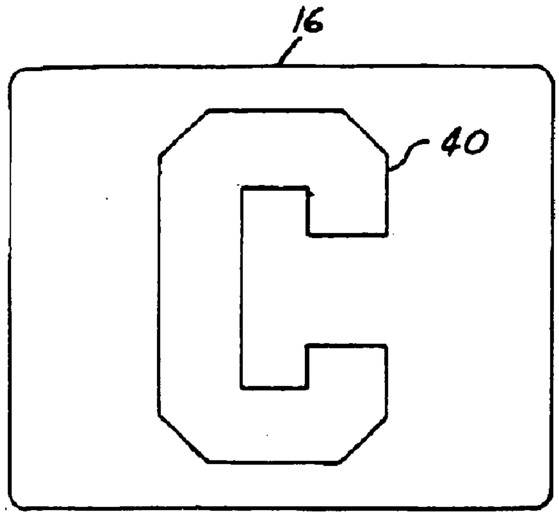
FIG. 5A is a view of a monitor depicting an image of a selected pattern to be cut by the laser apparatus.

Within an open file mode of the selection windows, the user selects a prestored file of a desired stitch pattern to be created by laser apparatus 14. In accordance with the selected file, control 12 accesses the file of the selected stitch pattern and monitor 16 displays an image of an outline of the pattern which will be cut by laser apparatus 14 as shown in FIG. 5A. A two or three dimensional image of the selected pattern may be displayed. In this embodiment, a two dimensional pattern 40 is shown in FIG. 5A.

Figure 5B:
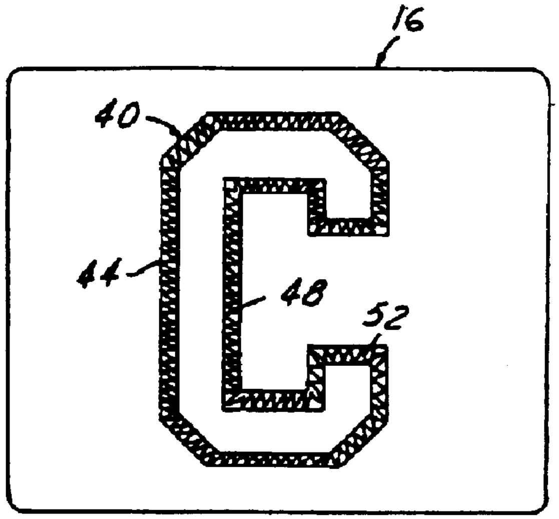
FIG. 5B is a view of a monitor depicting an image of the selected pattern of FIG. 5A having designated lines outlining paths along which the laser apparatus etches or cuts.

Within a stitch pattern setup mode, the user may outline a path along which laser head 22 will move in order to cut or etch. Shown by computer monitor 16 in FIG. 5B, this is completed by designating lines on the stitch pattern image. For example, within the stitch pattern setup mode, cuts made through both the top and bottom layers of the fabric may be designated with blue colored lines or cutthrough lines 44 on computer monitor 16. However, cuts made through only the top layer of the fabric may be designated as green colored lines or "kiss-cut" lines 48. Cuts made to etch or engrave on the fabric may be designated as red colored lines or etching lines 52.

Within an output setup mode of the selection windows, via monitor 16 the user selects the settings for laser head 22. For example, the user may vary the velocity and power at which laser head 22 operates along with other modifiable variables of laser apparatus 14. In this embodiment, the user varies the velocity and power in accordance to the paths (shown in FIG. 5B) along which laser head 22 moves. As conventionally performed, the lower the velocity and higher the power used of the laser beam, the deeper the cut or etch will result. For example, for a twill applique having a thickness of about 16 mil, along cut-through lines 44 of FIG. 5B, laser head 22 moves at a velocity of between 3 and 7 centimeters per second and at a power of between 16 and 20 watts. Preferably, along cut through lines 44, laser head 22 moves at 7 centimeters per second and at 18 watts. Along "kiss-cut" lines 48, laser head 22 moves at a velocity of between 5 and 8 centimeters per second and at a power of between 10 and 15 watts. Preferably, along kiss cut lines 48, laser head 22 moves at 7 centimeters per second at 12.5 watts. Along etching lines 52, laser head 22 moves at a velocity of between 2 and 6 centimeters per second and at a power of between 15 and 20 watts. Preferably, along etching lines 52, laser head 22 moves at 4 centimeters per second at 16.25 watts. It is to be noted that where different materials and thicknesses are used for cutting and etching thereon, parameters (speed, power) will vary. It is also to be noted that other settings may also be varied which include but is not limited to rotating, mirroring, copy number, and material.

Figure 6:
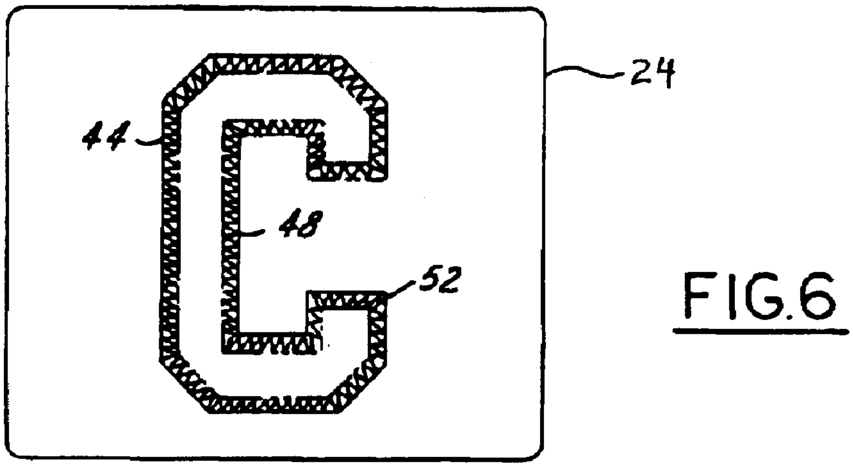
FIG. 6 is a plan view of a fabric after cutting and etching by the laser apparatus and before weeding.

After the output setup has been completed, via control 12 the user runs the cutting software which accesses the pattern 40 and output setup information for the pattern and the embroidery software packages. Upon activation of the software, laser apparatus 14 creates the pattern 40 on fabric 24 with the setup information. As shown in FIG. 6, pattern 40 is created on fabric 24 (see also FIGS. 2 and 3) by laser apparatus 14. FIG. 6 shows fabric 24 prior to an operator of apparatus 14 "weeding-out" or removing a portion of top layer 26 from bottom layer 28. As will be shown in greater detail below, cut-through lines 44 have been cut through both top and bottom layers 26, 28, kiss-cut lines 48 have been cut through only top layer 26, and etching lines 52 have been engraved or etched onto top layer 26.

Figure 7A:
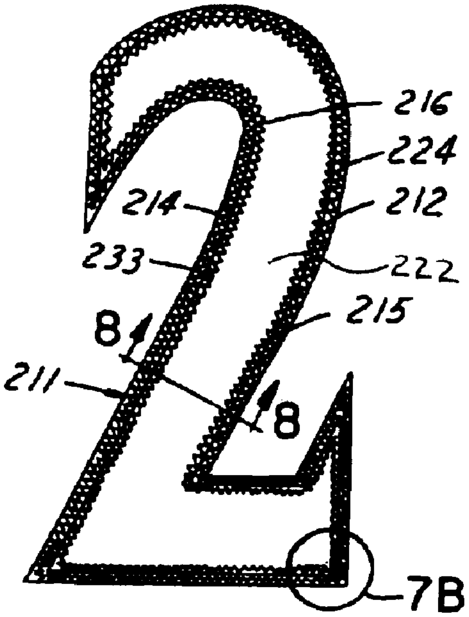
FIG. 7A is a plan view of an applique provided by the system of FIG. 1 and the method of FIG. 4.
Figure 7B:
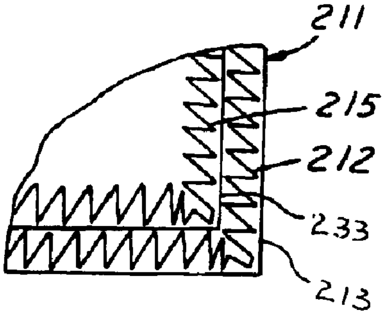
FIG. 7B is an enlarged view of circle 7B of FIG. 7A.
Figure 8:
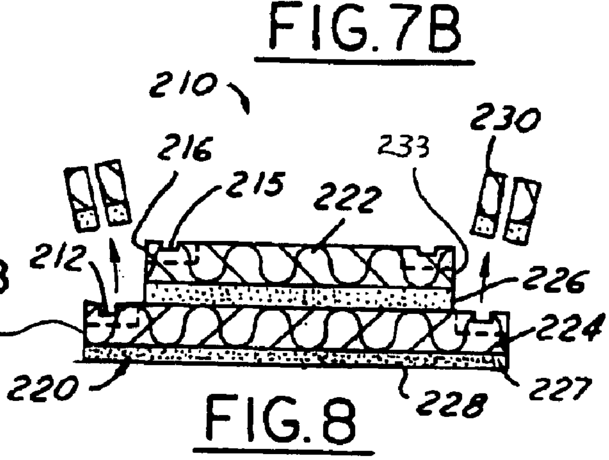
FIG. 8 is a cross-sectional view of the applique of FIG. 7A taken along lines 8—8.

As shown in FIGS. 7A, 7B and 8, method 110 of FIG. 4 implemented by system 10 of FIG. 1 provides for applique 210 for applying a fabric pattern to an object. Applique 210 includes laminate 211 having outer periphery 213 to define first predetermined shape or outline 214 corresponding to the fabric pattern. Laminate 211 has etches or predetermined etched pattern 212 formed adjacent periphery 213 to simulate an appearance of "zig-zag" stitching. As shown in FIGS. 7A and 7B, top layer 222 is configured to have second predetermined outline 216, wherein top layer 222 is attached to bottom layer 224 and disposed inward from first predetermined outline 214. As shown, bottom layer 224 takes on first predetermined outline 214 and has predetermined etched pattern 212 formed thereon adjacent the outer periphery 213, thereby simulating the appearance of "zig-zag" stitching. As shown, laminate 211 further includes inner periphery 233 to define second predetermined outline 216. Top layer 222 has etches 215 formed thereon adjacent inner periphery 233. As shown in FIGS. 7A and 8, applique 210 further includes second predetermined outline or shape 216. Laminate 211 has top layer 222 disposed on bottom layer 224 by first adhesive 226. As shown in FIG. 8, second adhesive 228 is disposed on undersurface 227 of bottom layer 224.

As shown in FIG. 8, first adhesive layer 226 is disposed between layers 222, 224 to bond the layers. First adhesive layer 226 may be any suitable heat or pressure sensitive permanent adhesive conventionally sold. Second adhesive layer 228 is disposed on the other side or undersurface 227 of bottom layer 224. Second adhesive layer 228 may be any suitable heat sensitive permanent adhesive or pressure sensitive permanent adhesive conventionally sold.

Figure 9A:
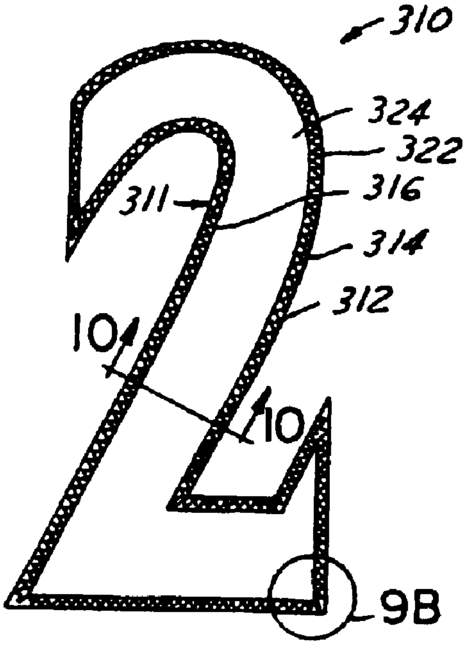
FIG. 9A is a plan view of another applique provided by the system of FIG. 1 and the method of FIG. 4.
Figure 9B:
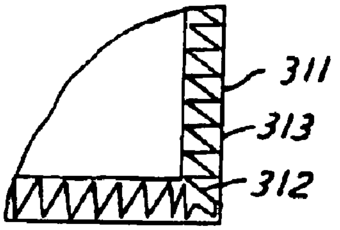
FIG. 9B is an enlarged view of circle 9B of FIG. 9A.
Figure 10:
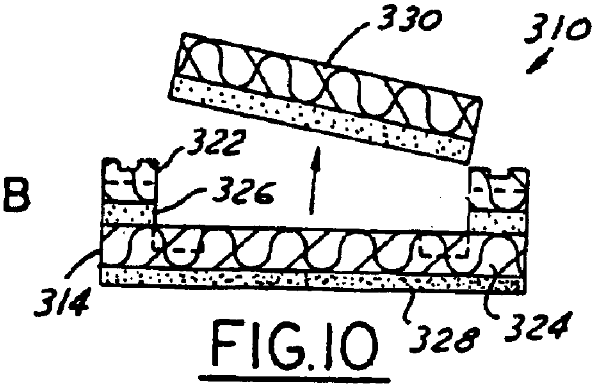
FIG. 10 is a cross-sectional view of the applique of FIG. 9A taken along line 10—10.

As shown in FIGS. 9A, 9B, and 10, method 110 of FIG. 4 implemented by system 10 of FIG. 1 provides for applique 310 for applying a fabric pattern to an object. Applique 310 includes laminate 311 having outer periphery 313 to define first predetermined shape or outline 314 corresponding to the fabric pattern. Laminate 311 has etches or etched pattern 312 formed adjacent periphery 313 to simulate an appearance of "zig-zag" stitching. Laminate 311 comprises top fabric layer 322 and bottom fabric layer 324 with periphery 325 corresponding to outer periphery 313. Top fabric layer 322 is a strip of fabric attached to bottom layer 324, wherein top fabric layer 322 is disposed adjacent outer periphery 313. Top fabric layer 322 includes etches or predetermined etched pattern 312 formed on top fabric layer 322 so that top fabric layer 322 simulates the appearance of "zig-zag" stitching.

As shown in FIG. 10, laminate 311 has top layer 322 disposed on bottom layer 324 by first adhesive 326 to bond the layers together. First adhesive layer 326 may be any suitable heat or pressure sensitive permanent adhesive conventionally sold. Second adhesive layer 328 is disposed on the other side or under surface 327 of bottom layer 324 for applying applique 310 onto a garment or hard surface. Second adhesive layer 328 may be any suitable heat or pressure sensitive permanent adhesive conventionally sold.

Upon completion of laser apparatus 14 creating the pattern on the fabric layers with the set-up information, laser head 22 returns to a point of origin, allowing the user to retrieve the applique. As shown in FIGS. 8 and 10, "weeded-out" portions 230 and 330 are removed from appliques 210 and 310, respectively, and discarded. The laser beam cuts through the layers to define the outer periphery, "kiss-cuts" at least one of the layers such that portions of the layers may be "weeded-out" as shown in FIGS. 8 and 10, and etches at least one of the layers to form the appearance of stitching.

Figure 11A:
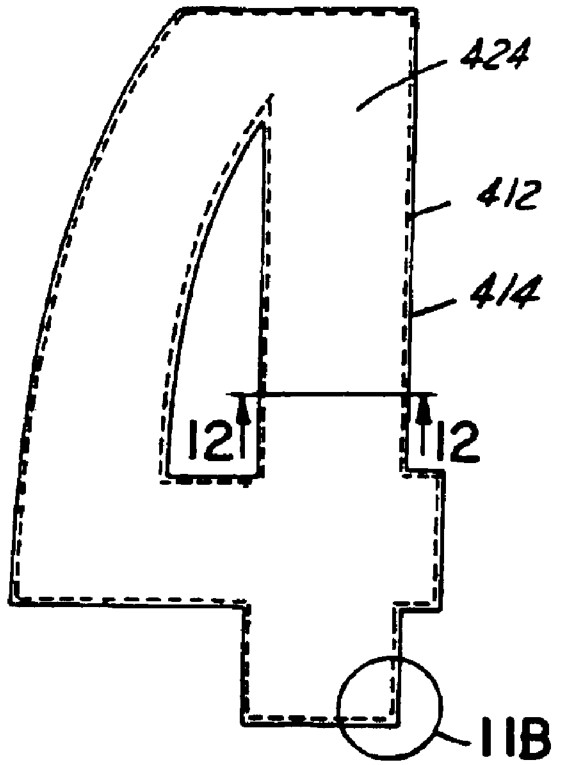
FIG. 11A is a plan view of yet another applique provided by the system of FIG. 1 and the method of FIG. 4.
Figure 11B:
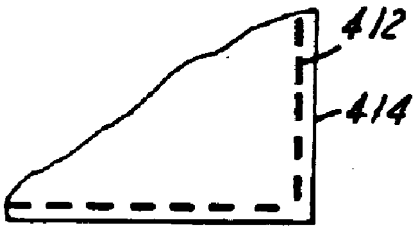
FIG. 11B is an enlarged view of circle 11B of FIG. 11A.
Figure 12:
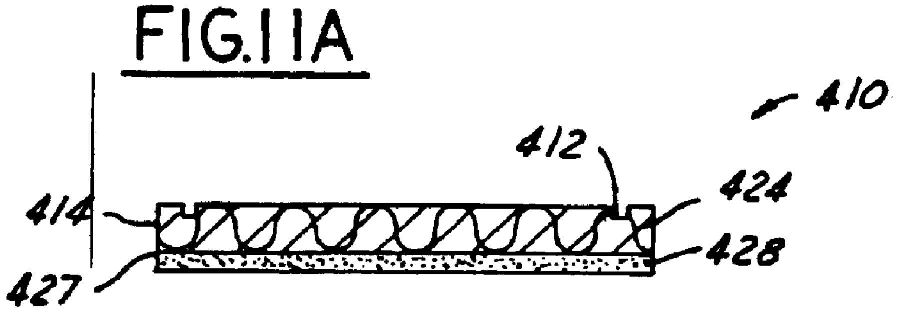
FIG. 12 is a cross-sectional view of the applique of FIG. 11A.

As shown in FIGS. 11A, 11B, and 12, method 110 of FIG. 4 implemented by system 10 of FIG. 1 provides for applique 410 for applying a fabric pattern to an object. Applique 410 has outer periphery 413 to define first predetermined shape or outline 414 corresponding to the fabric pattern. Applique 410 has etches or etched pattern 412 formed thereon adjacent periphery 413 to simulate an appearance of "dash" stitching. As shown, applique 410 comprises a single fabric layer 424 which has predetermined etched pattern 412 formed thereon adjacent outer periphery 413. As shown in FIG. 12, adhesive layer 428 is disposed on the under surface 427 of layer 424. Adhesive layer 428 may be any suitable heat sensitive permanent adhesive or pressure sensitive permanent adhesive conventionally sold.

As shown in the drawings, appliques 210, 310, and 410 include fabrics having etched patterns which simulate an appearance of "dash" and "zig-zag" stitching. This is accomplished by etching onto the surface of the fabric layer with a laser beam from the laser head. In etching the heat from the laser beam preferably burns the fabric without cutting through it and offsets the original color viewed thereon, thereby darkening the laminate where burned. The burned or etched portions of the fabric layer result in having a darker pigment which provides a simulated appearance of stitching.

It is to be noted that as a laser beam etches or cuts the top and bottom layers of a laminate, the heat and pressure exposed upon the layers serves to seal the top and bottom layers together. As a result, portions etched onto the layers add heightened adherence between the top and bottom layers, with the first adhesive there between.

It is also to be noted that, although one and two fabric layers (top and bottom) are provided herein, the present invention may involve more than two fabric layers. That is, embodiments of the present invention mentioned above may be combined as desired to form an applique. The implementation of more or less than two fabric layers would not fall beyond the scope and spirit of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an applique comprising:

juxtaposing a top fabric layer and a bottom fabric layer;

laser cutting through the layers to define the outer periphery of the design of the bottom fabric layer;

kiss-cutting through the top fabric layer inwardly of the periphery of the bottom fabric layer with a laser beam to define a periphery of the top fabric layer design spaced from the periphery of the bottom fabric layer;

peeling away the marginal edge of the top fabric layer to expose the bottom fabric layer; and etching with a laser beam a periphery of at least one of such layers to form an appearance of stitching thereon.

2. The method of claim 1 wherein the laser kiss-cutting and laser etching are sufficient to bond the fabric layers together at the periphery of the top fabric layer.

3. The method of claim 1 wherein the periphery of the top fabric layer cut with the laser beam is the outer periphery of the top fabric layer.

4. The method of claim 1 wherein the periphery of the top fabric layer cut with the laser beam is an inner periphery of the top layer design.

5. The method of claim 1 wherein following the kiss-cutting of the top fabric layer such layer adjacent the kiss-cut is weeded away.

6. The method of claim 5 wherein following the weeding away of the top fabric layer adjacent the kiss-cutting, one or both fabric layers are laser etched to simulate stitching in the weeded area.

* * * * *